United States Patent [19]
Yun

[11] Patent Number: 5,444,714
[45] Date of Patent: Aug. 22, 1995

[54] COMMUNICATION AND EXCHANGE PROCESSING SYSTEM

[75] Inventor: Hee-sun Yun, Suwon, Rep. of Korea

[73] Assignee: SamSung Electronics Co., Ltd., Suwon, Rep. of Korea

[21] Appl. No.: 982,896

[22] Filed: Nov. 30, 1992

[51] Int. Cl.$^6$ .............................................. G06F 11/00
[52] U.S. Cl. ................................................ 371/182.02
[58] Field of Search ................. 371/8.1, 8.2, 9.1, 11.1;
395/575, 550, 200; 361/944, 944.1, 944.2

[56] References Cited

U.S. PATENT DOCUMENTS

| | | |
|---|---|---|
| 4,503,490 | 3/1985 | Thompson . |
| 4,700,348 | 10/1987 | Ise et al. ............................ 371/8.2 |
| 4,777,595 | 10/1988 | Stecker et al. . |
| 4,894,827 | 1/1990 | Ramsay et al. .................... 371/8.2 |
| 5,006,978 | 4/1991 | Neches . |
| 5,014,261 | 5/1991 | Shinbashi et al. ................. 371/8.1 |
| 5,041,966 | 8/1991 | Nakai et al. . |
| 5,072,373 | 12/1991 | Dann . |

OTHER PUBLICATIONS

"An Introduction to Operating Systems", Second Ed. by Harvey M. Deitel ©1990 by Addison-Wesley Pub. Co. Inc. pp. 25 & 536.

*Digital Computer Fundamentals* Sixth Edition by Thomas C. Bartee ©1985 by McGraw-Hill Inc. pp. 400–409.

*Primary Examiner*—Vincent P. Canney
*Attorney, Agent, or Firm*—Robert E. Bushnell

[57] ABSTRACT

A method for reducing the occurrence of a system-down phenomenon due to a communication clock trouble in a communication/exchange processing system, where possible, is described. In a communication/exchange processing system comprising a plurality of reference communication clock generators, a plurality of clock modules for selectively receiving one of the plurality of reference communication clocks to generate various application communication clocks (only one of which is active at a time), a multi-line interfacer for performing a connection processing with each node on a network, a communication processor for performing communication/exchange control operations, and a switching module for performing a switching operation via software according to channels, a clock control method comprises the steps of polling status ports of the clock modules to determine whether there is clock trouble, determining whether there is an alternative reference communication clock in an active clock module when clock trouble occurs, changing an input reference communication clock, when an alternative reference communication clock exists in an active clock module, determining whether there is a standby clock module, when there is no alternative reference communication clock in an active clock module and shutting the system down in the absence of a standby clock module, and activating a standby clock module and repeating the above steps in the presence of a standby clock module. The present method can improve the reliability of a communication network.

17 Claims, 9 Drawing Sheets

COMMUNICATION AND EXCHANGE PROCESSING SYSTEM

BACKGROUND OF THE INVENTION

The present invention relates to a communication/exchange processing system and more particularly to a system for preventing a system-down phenomenon due to trouble with communication clocks used to perform data transmission/reception.

Generally, clocks can be divided into a process clock used to perform a work in a node and a communication clock used to transmit/receive data to/from another node. The process clock is generally a clock used in CPUs included in each node and is used by being generated through a crystal oscillator, etc. However, the communication clock relates to data transmission/reception, and its pulse width should be precisely controlled, as compared with the process clock. There are several devices for generating such a reference communication clock. A typical one is a standard communication clock generator comprising not only an oscillation circuit but also several stabilization circuits to stabilize the pulse width of clock output from the oscillation circuit, and the generator itself is constituted by a high precision control system. Accordingly, such a standard communication clock generator STD is very expensive as compared with an ordinary crystal oscillator. Due to this reason, all nodes constituting a network system generally do not have a standard communication clock generator STD but several nodes constitute a group so that each group generally has only one standard communication clock generator.

FIG. 1 shows the constitution of such a network, in which each group comprises several nodes.

In FIG. 1, when a node N 1 of nodes included in a group-1 comprises a standard communication clock generator STD, the other nodes (N2, N3, N4, N5, N6, N7 ...) included in the same group receive a standard communication clock from node N1 and generate a communication clock using a clock recovery circuit. Here, each node has the constitution as shown in FIG. 2.

With reference to FIG. 2, a node comprises a communication/exchange processing portion 201 and a subscriber processing portion 202. The communication/exchange processing portion 201 is a portion for performing a required operation when data is transmitted to or received from other nodes included in the network or received from other nodes and simultaneously performing an exchanger control of data which is transmitted and received through its node. Subscriber processing portion 202 is for user operating regions belonging to each node and has such a constitution as shown in FIG. 3. In FIG. 3, subscriber control portion 301 performs an entire control of subscriber processing portion 202, and comprises an analog line interface (ALI) for performing an interface with respect to analog type terminal equipments and a digital line interface (DLI) for performing an interface with respect to digital type terminal equipment. The ALI may be connected with analog telephone equipment 302, and the DLI may be connected with digital telephone equipment 303, facsimile equipment 304, monitor 305, printer 306, copier 307, ..., etc.

Meanwhile, a conventional communication/exchange processing portion 201 is constructed as shown in FIGS. 4A and 4B, which comprises a multi-line interface means ML1, a switching module SWM, a communication processor CPM, a standard communication clock generator STD, a memory MEM and a clock module CKM, or comprises a multi-line interface means ML1, a switching module SWM, a communication processor CPM, a recovery communication clock generator RCV, memory MEM and clock module CKM. As the device for generating a reference communication clock, standard communication clock generator STD is used in FIG. 4A, and recovery communication clock generator RCV is used in FIG. 4B. The reference communication clock generated through the above apparatuses is supplied to clock module CKM to generate various application communication clocks used for communication operations. The switching module SWM is for performing a switching operation via software, one end of which is connected to the multi-line interface means ML1 and the subscriber processing portion while its other end is connected to the communication processor CPM and clock module CKM, etc., thereby performing a switching operation according to channels. For instance, if there are twelve logic channels per transmission line, assuming that a first channel is for transmitting and receiving a communication clock, a second to tenth channels are for transmitting and receiving data between the communication processors of the respective nodes, eleventh and twelfth channel are for transmitting and receiving data between communication processor CPM and subscriber processing portion, switching module SWM connects multi-line interface means ML1 to clock module CKM in the case of the first channel, to communication processor CPM in the case of the second to tenth channels, and connects communication processor CPM to subscriber processing portion 202 in the case of the eleventh and twelfth channels.

However, the data communication/exchange processing portion 201 having the above-described constitution does not have a measure for the prevention of clock trouble, thereby experiencing occurrences of the system-down phenomenon of communication/exchange processing portion 201, that is, to make communication with other nodes impossible. Also, as shown in FIG. 1, even if communication/exchange processing portion 201 is not down, communication is still impossible when all of the communication/exchange processing portions of adjacent nodes are down. Accordingly, the occurrence of the system-down phenomenon of communication/exchange processing portion 201, should be reduced wherever possible.

SUMMARY OF THE INVENTION

To solve the problems of the prior art, it is an object of the present invention to provide a clock control method for a communication/exchange processing system capable of reducing the occurrence of a system-down phenomenon of a communication/exchange processing portion due to communication clock trouble.

It is another object of the present invention to provide a communication/exchange processing system which can perform the above method.

To achieve the object, in a method for reducing the occurrence of a system-down phenomenon due to communication clock trouble in a communication/exchange processing system comprising a plurality of reference communication clock generators, a plurality of clock modules for selectively receiving one of the plurality of reference communication clocks and generating various application communication clocks, and each having status ports, only one of which being active at a given time, multi-line interface means for performing a connection process with a plurality of data transmission lines, a communication processor for performing communication/exchange control operations, and a switching module for performing a switching operation via software according to channels, there is provided a clock controlling method of a communication processing system comprising the steps of:

polling status ports of the clock modules at a given interval and determining whether clock trouble exists;

determining whether an alternative reference communication clock exists in an active clock module, if clock trouble exists;

changing a received reference communication clock, if the alternative reference communication clock exists in the active clock module;

determining whether a standby clock module exists, if no alternative reference communication clock exists in the active clock module; and shutting the system down in the absence of the standby clock module, and otherwise activating the standby clock module and then repeating the above described previous steps.

To achieve another object, there is provided a communication/exchange processing system constituting one network, comprising:

multi-line interface means for interfacing with a plurality of data transmission lines;

a plurality of reference communication clock generators operated independent of each other, for generating respective reference communication clocks;

a plurality of clock modules commonly connected to the plurality of reference communication clock generators, for receiving a reference communication clock at a given time and generating a plurality of application communication clocks used in communication, and having status ports showing the operation states of the plurality of clock modules;

a communication processor connected to the status ports of the plurality of clock modules, for selectively activating one of the plurality of clock modules at a given time, and checking the state of the activated clock module by polling at predetermined intervals to change the reference communication clock input by the activated clock module and/or to change the activated clock module if the activated clock module is determined to be abnormal, and for performing communication control operations; and a switching module, one end of which is connected to the multi-line interface means and the other end of which is commonly connected to the communication processor and the plurality of clock modules, to perform a switching operation via software according to channels.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

Figure 1:
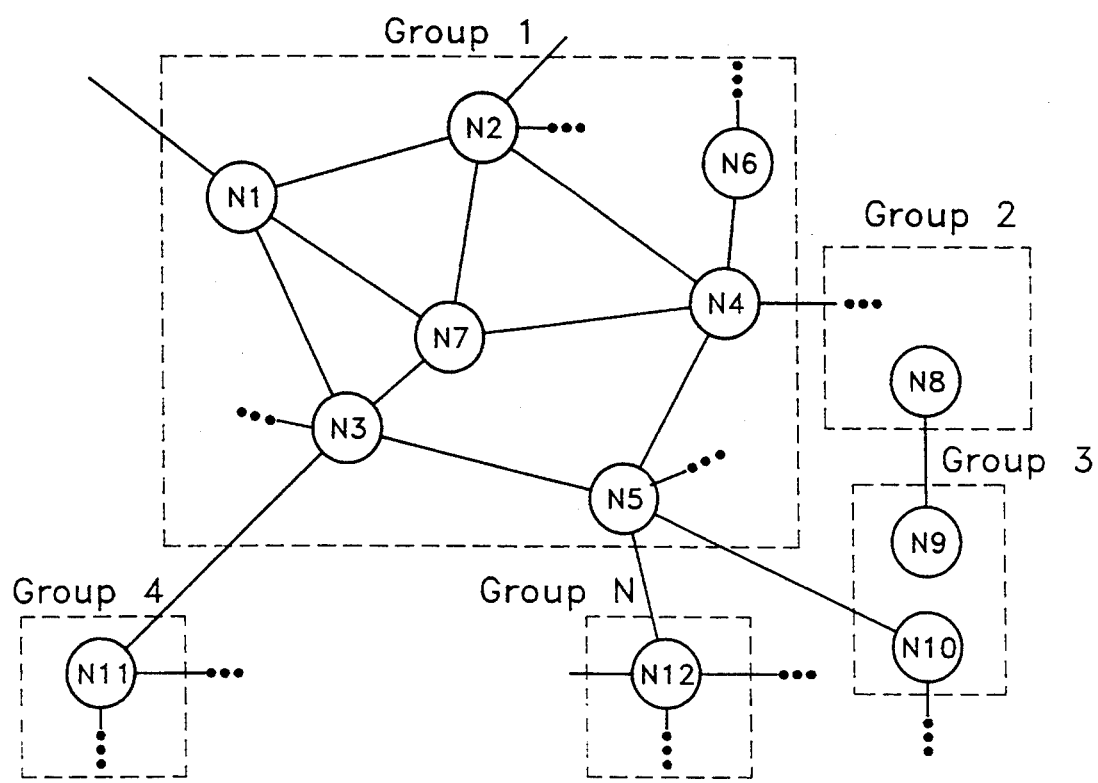
FIG. 1 illustrates a constitution of a general network to which prior art and the present invention is adapted.
Figure 2:
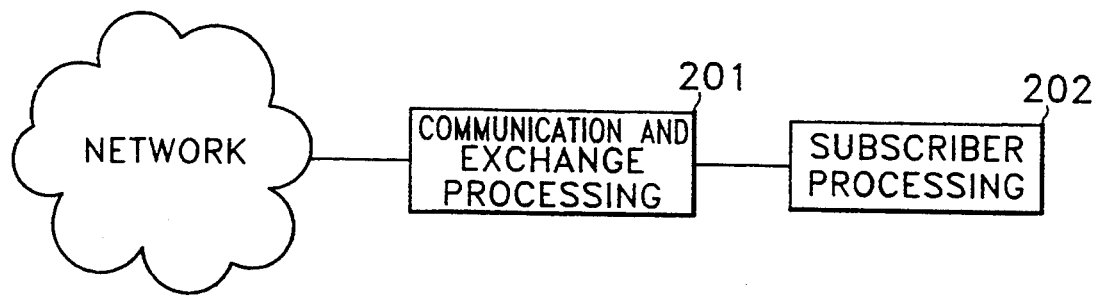
FIG. 2 illustrates a constitution of node of network shown in FIG. 1.
Figure 3:
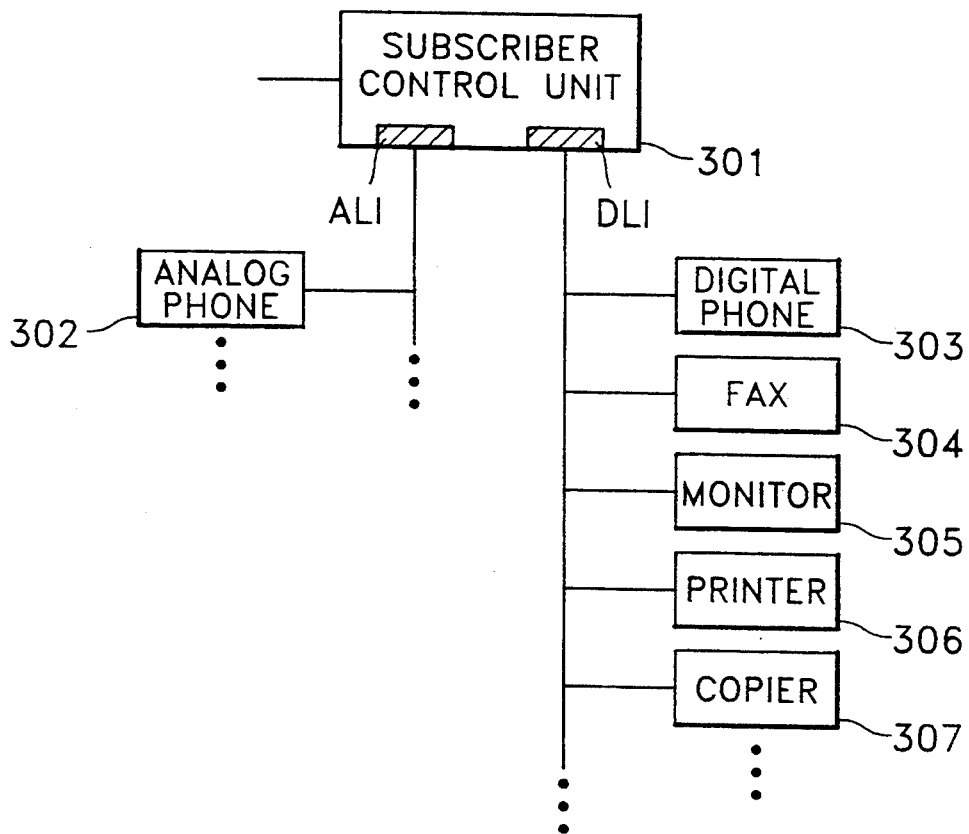
FIG. 3 is a block diagram showing a constitution of a subscriber processing portion shown in FIG. 2.
Figure 4A:
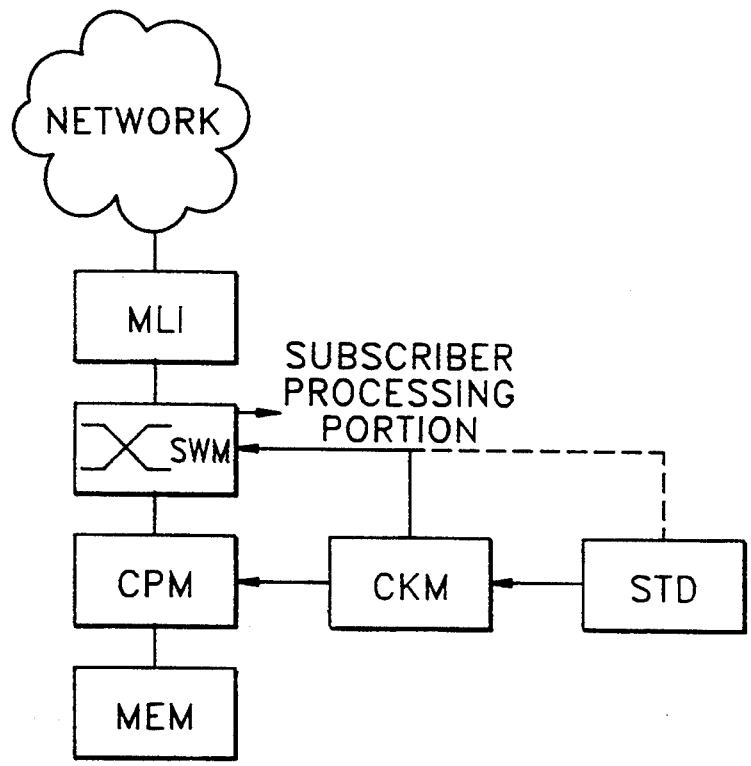
FIGS. 4A and 4B are block diagrams showing constitutions of conventional communication/exchange processing portions.
Figure 4B:
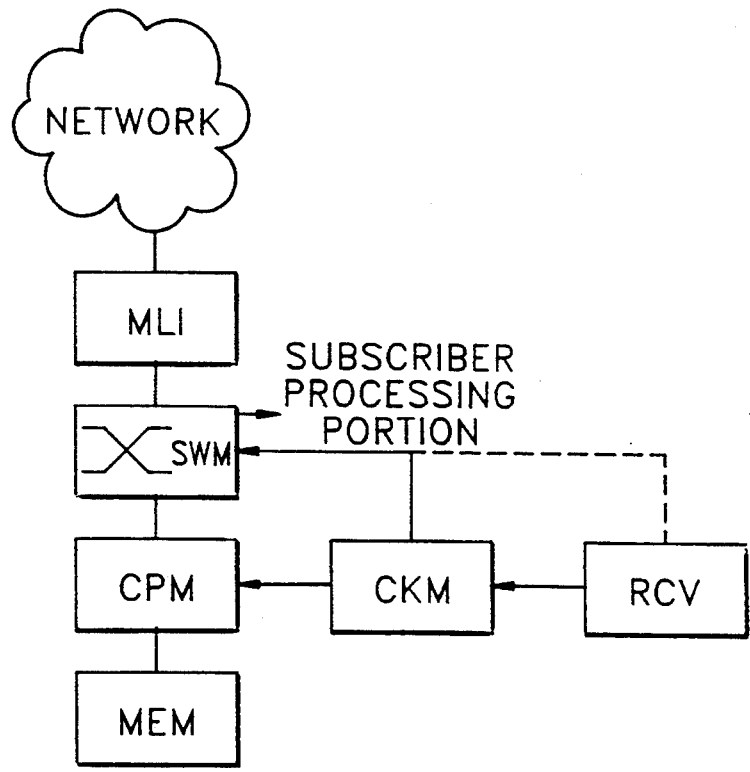
Figure 5A:
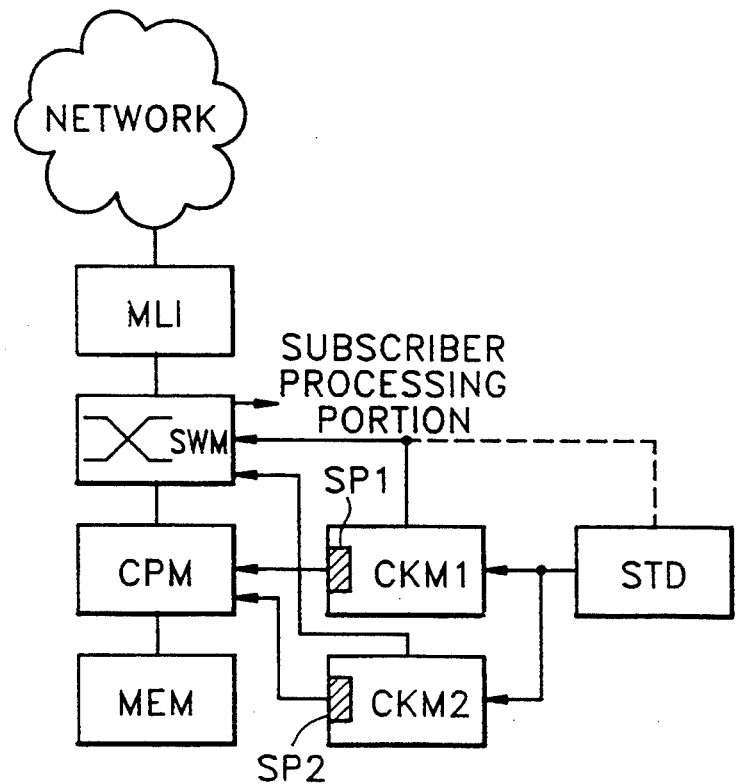
FIGS. 5A, 5B, 6 and 7 show block diagrams of a communication/exchange processing system according to the present invention, which can reduce the occurrence of a system-down phenomenon due to clock trouble.
Figure 5B:
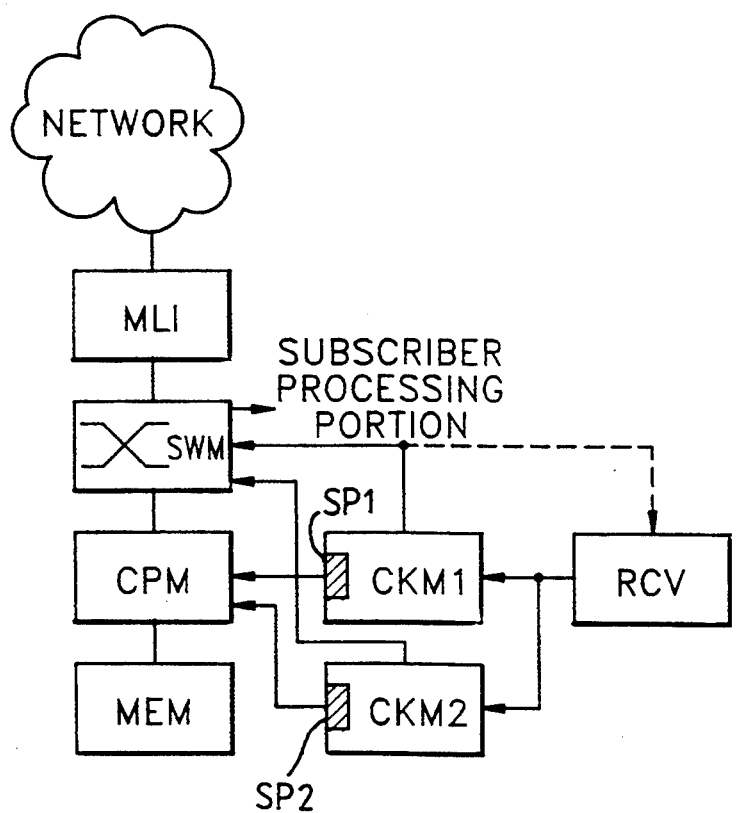
Figure 8:
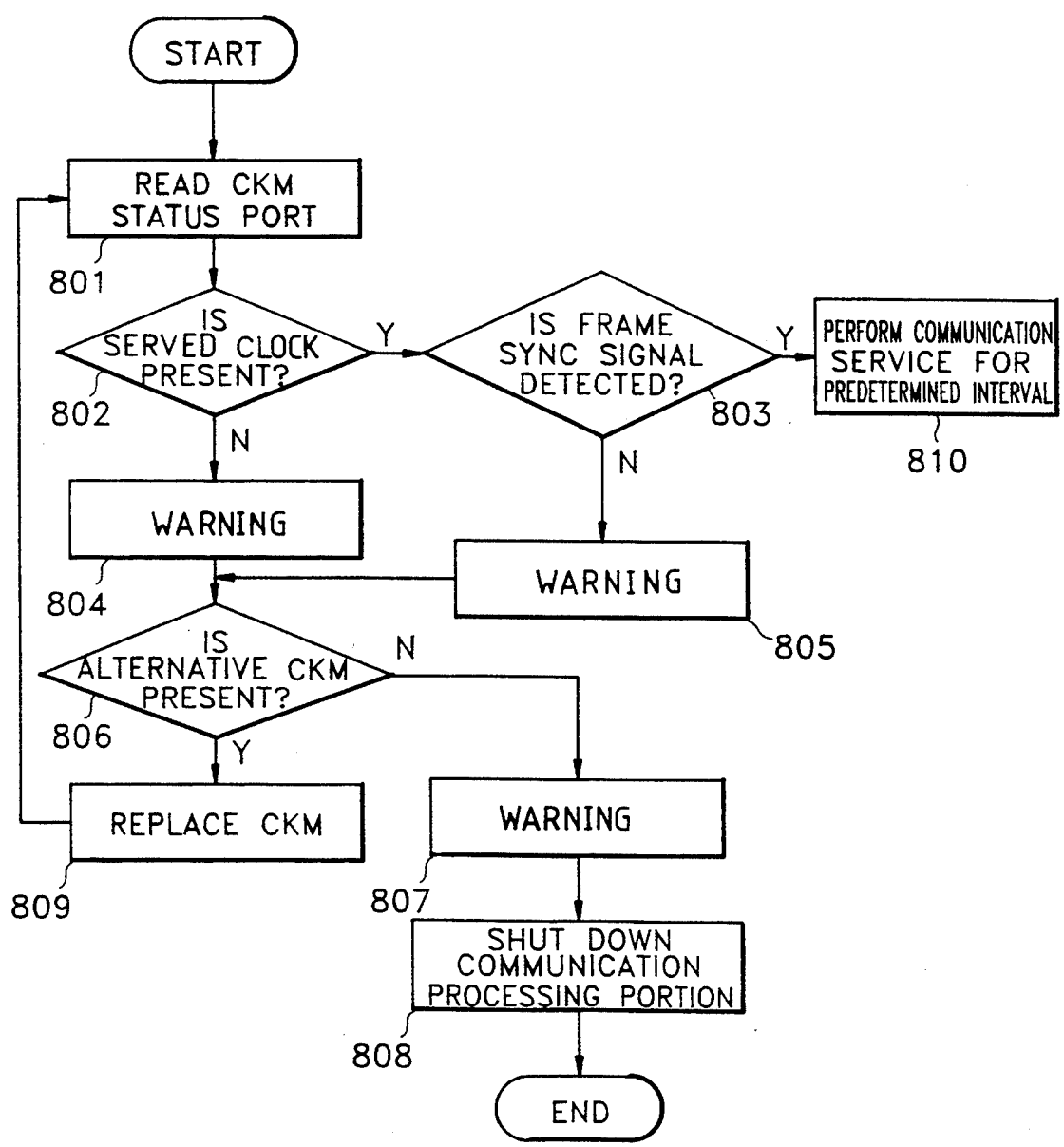
FIGS. 8 to 10 are flowcharts showing a clock controlling method of a communication/exchange processing system according to the present invention, which can reduce the occurrence of a system-down phenomenon due to clock trouble.

First of all, the duplication of clock module CKM of communication/exchange processing portion 201 is described with reference to FIGS. 5A and 5B. FIG. 5A shows a communication/exchange processing portion 201 using a standard communication clock generator STD as a reference communication clock generator, and FIG. 5B shows a communication/exchange processing portion 201 using a recovery communication clock generator RCV as a reference communication clock generator. In FIGS. 5A and 5B, a first clock module CKM1 and a second clock module CKM2 are means for receiving reference communication clocks, respectively, and generating several application communication clocks, and only one of which is selectively active at a given time. Also, first clock module CKM1 and second clock module CKM2 include a first status port SP1 and a second status port SP2, respectively. The output terminals of the first and second status ports are connected to the communication processor CPM, so that their values are read at predetermined intervals, i.e. polled by the communication processor CPM, to determine their state. FIG. 8 is a flowchart showing a clock controlling method performed in the communication processor CPM, when the clock module CKM is duplicated as described above.

Referring to FIG. 8, step 801 is to read a status port of the clock module CKM, in which a status port value of one active clock module between the first clock module CKM1 and the second clock module CKM2 is read. The value output from the status port can be of several types according to constitution, with one example being shown in the following Table 1.

TABLE 1

| status port output bit | D1 | D0 |
|---|---|---|
| indicated state | standby | STD/RCV |

From Table 1, if the value of D 1 is "1,"it means that the corresponding clock module CKM is in standby, and if its value is "0,"it indicates that it is in the active state or it is not in standby due to the occurrence of some trouble. Also, if the value of D0 is "1,"it indicates that a reference communication clock such as a standard communication clock or a recovery communication clock, etc. is served, and otherwise, it indicates that no reference communication clock is served. Step 802 is to determine which value a predetermined status port bit has, and in an example like Table 1, either step 803 or step 804 is performed according to the value of D0. Step 803 is to determine whether, in the case of the existence of a served clock, the served clock is actually and exactly synchronized with the communicated other side, and accordingly, determines whether a frame sync signal is detected ill the data received through the multi-line interface means ML1. If the synchronization is exactly formed, the frame sync signal is detected, and if not, the frame sync signal is not detected. Accordingly, if a frame sync signal is detected, step 810 is performed to carry out communication service for a predetermined interval and then step 801 is performed to check the values of the status ports of clock modules CKM by polling at a given interval in time.

Step 804 is to perform a predetermined warning when there is no reference communication clock served ill the active clock module CKM. As the warning method, there may be a buzzer sound generation method for warning and a display method for displaying a warning message on a predetermined liquid crystal panel. Step 805 is to carry out a warning when a frame sync signal is not detected. Here, the warnings generated in steps 804 and 805 may be different from each other so that the user can be aware which type of trouble has occurred. Step 806 is to determine whether there is a standby clock module CKM, and is performed by checking the value of a predetermined bit of the status port of each clock module CKM. At this time, if a standby clock module CKM does not exist, a warning operation is carried out, and then the communication-/exchange processing portion is shut down, and if there is a standby clock module, the clock module is replaced, and step 801 is then performed to again check the state. Here, when there are two or more standby clock modules (CKM), a priority for each clock module CKM is set, and the clock module having the higher priority value is selected first.

Figure 6:
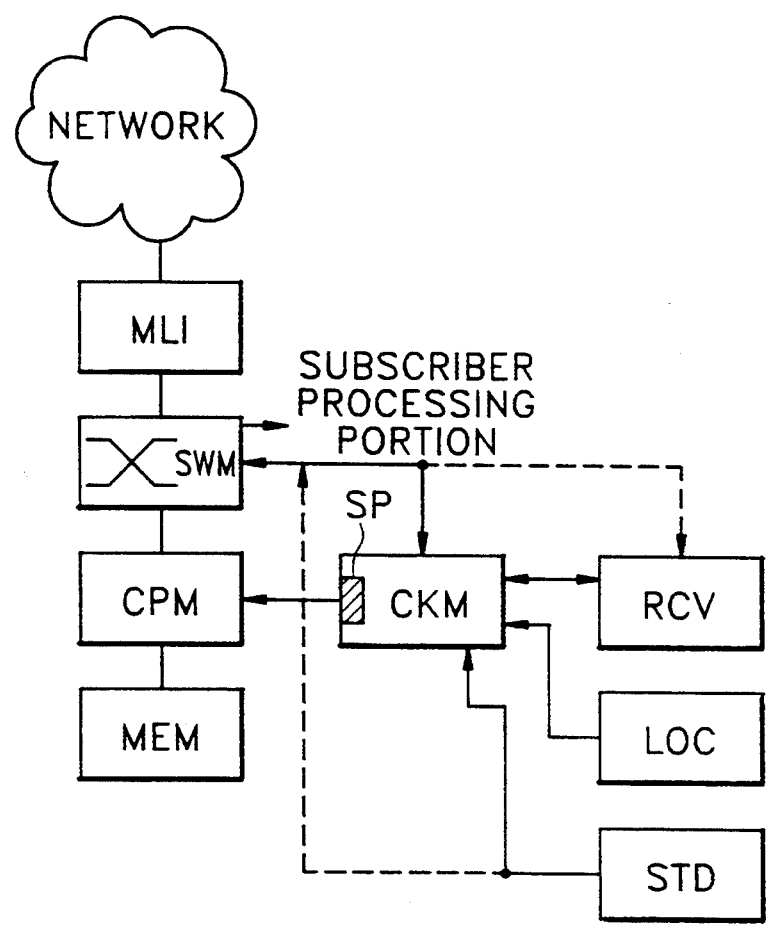

FIG. 6 shows the duplication of a reference communication clock generator, which reduces the occurrence of a system-down phenomenon due to clock trouble of the communication/exchange processing portion, in which the reference communication clock generator may be a standard communication clock generator STD, a recovery communication clock generator RCV, a local communication clock generator LOC, etc. Here, local communication clock generator LOC is a reference communication clock generator which has a relatively low price (like the clock generator used in subscriber processing portion 202), and is given with a lowest priority to prepare for the worst case. In this case, and example of the output values indicated by the status ports of clock modules CKM are shown in the following Table 2.

TABLE 2

| status port output bit | D2 | D1 | D0 |
|---|---|---|---|
| indicated state | STD | RCV | LOC |

In Table 2, when the value of each bit is "0,"it indicates that a corresponding communication clock is not served, and a "1" indicates that a corresponding communication clock is served.

A clock controlling method in a communication/exchange processing portion where the clock module CKM and the reference communication clock generator are duplicated as above, is explained with reference to FIG. 9.

Figure 9:
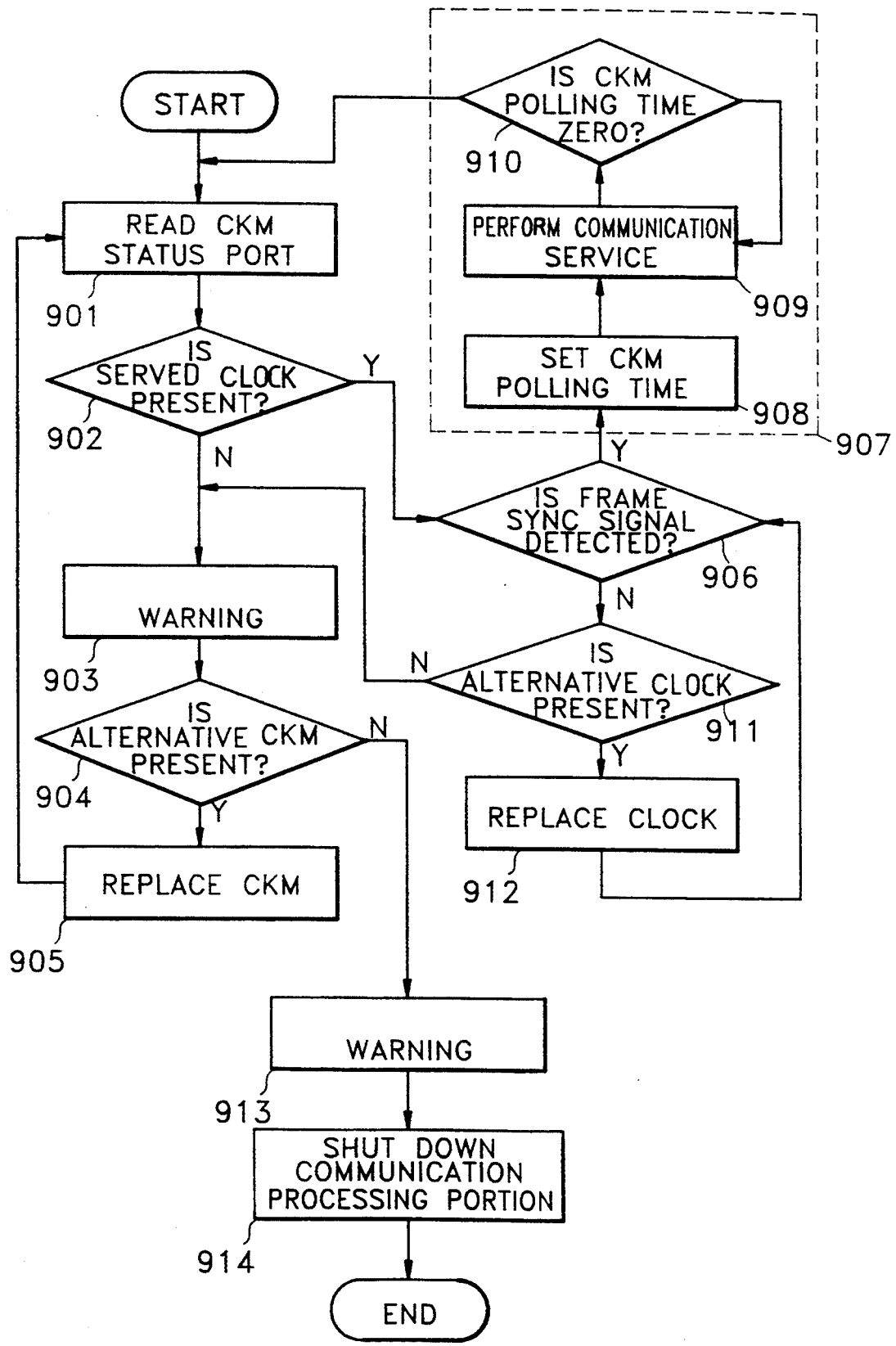

In FIG. 9, step 901 is to read a status port of an active clock module CKM, and step 902 is to check whether a served clock exists. If there is a served clock, it is determined whether the detection of a frame sync signal exists, in step 906, to determine if the clock is synchronized. If a clock is exactly synchronized and operated in step 906, the next step branches to step 907 to carry out a communication service for a predetermined interval. Steps 908 to 910 explain the above-mentioned step for the communication service for a predetermined interval, in more detail, in which a polling time of clock module CKM is set to a predetermined value so as to control the time to be polled, when the check of a status port of clock mode CKM is completed. At this time, the polling time of clock module CKM is designed to continually decrease as time passes. Accordingly, when the value reaches "0," the communication processor CPM again reads a status port of clock module CKM. Step 911 is to check whether there is a alternative clock for replacement, when a frame sync signal is not detected. Accordingly, if all alternative clock exists, the reference communication clock received in the clock module CKM is changed. Step 903 is to generate a warning message that trouble has occurred in a clock module CKM, and step 904 is to check whether there is an alternative clock module CKM. If there is no standby clock module, a warning message is generated and the communication/exchange processing portion is shut down. If there is a standby clock module CKM, the active clock module is changed, and step 901 is then performed to again check the state. Here, if there is a trouble with the clock module CKM and accordingly one of other clock modules CKM is selected, the bit of the status port indicating the standby state of the clock module indicates "no standby," for example, a "0." At this time, if the clock module trouble is solved by repair or alternative means, the bit value of status port showing the standby is set to again "standby," for example a "1."

Figure 7:
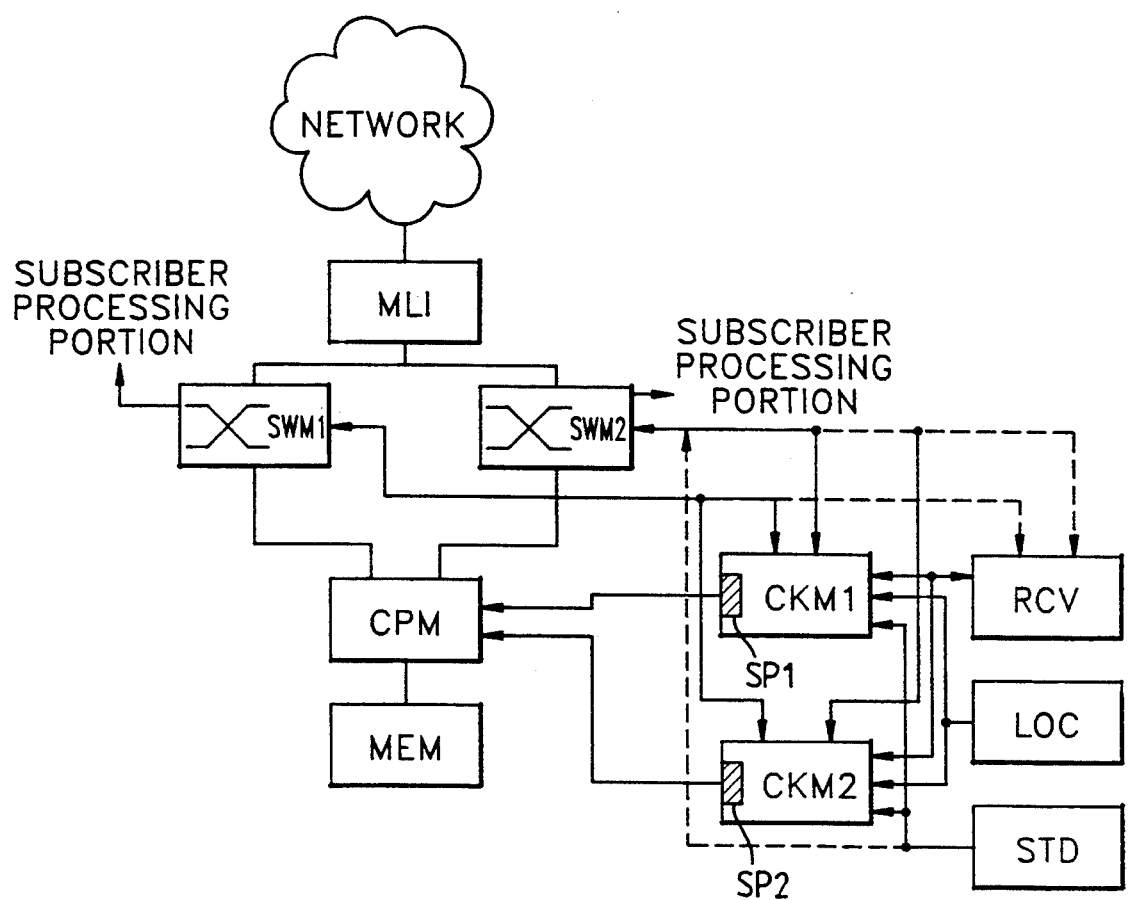

FIG. 7 is a block diagram showing the duplication of the clock module, the reference communication clock generator and the switching module, to reduce the occurrence of a system-down phenomenon of the communication/exchange processing portion caused due to clock trouble, which comprises a multi-line interface means ML1, a first switching module SWM1, a second switching module SWM2, a first clock module CKM1, a second clock module CKM2, a plurality of reference communication clock generators (RCV, LOC, STD, etc.), a communication processor CPM, and a memory MEM.

In FIG. 7, a first switching module SWM1 and a second switching module SWM2 are respectively connected to multi-line interface means ML1, first clock module CKM1 and second clock module CKM2, and communication processor CPM, wherein only one is active at a given time. The clock controlling method in the communication/exchange processing portion constituted as above is described with reference to FIG. 10.

Figure 10:
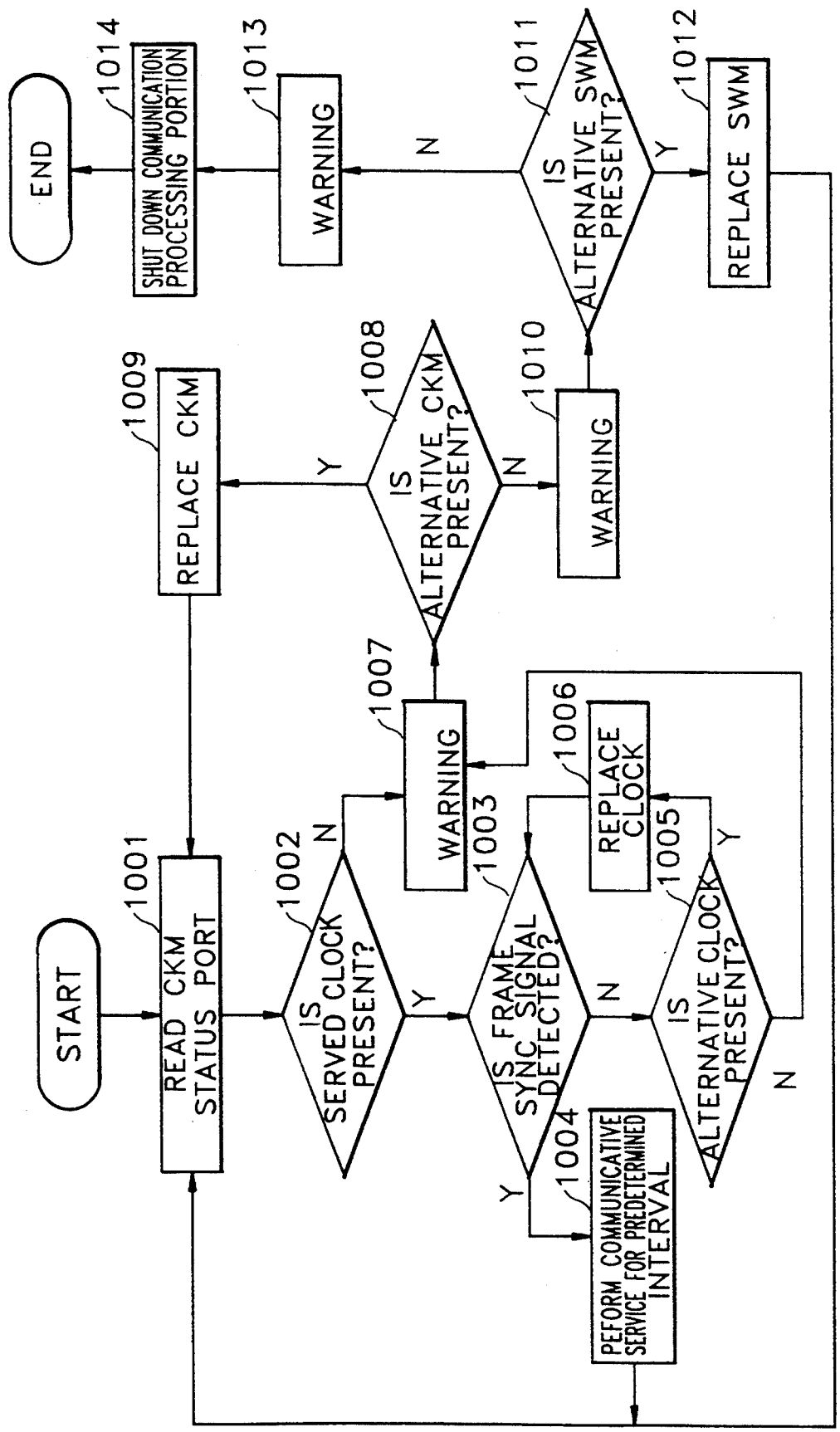

In FIG. 10, a status port of a clock module in an active state is read in step 1001, and then it is determined whether there is a served clock, in step 1002. If there is a served clock, it is checked whether a frame sync signal is detected, in step 1003, to determine whether the clock is correctly synchronized. If the communication clock is synchronized with a clock of one node in the communicated other side, and accordingly a frame sync signal is detected, a communication service for a predetermined interval is performed in step 1004, and then step 1.001 is performed to again check the state. Since the absence of a frame sync signal in step 1003 means that the served clock is not synchronized with the communicated other side, it is checked whether an alternative clock is available for replacement. If there is an alternative clock, the clock is replaced and step 1003 is performed to again check whether or not the frame sync signal is detected. If no alternative clock exists, a warning operation is carried out in step 1007 and step 1008 is performed. Also, in step 1002, if no served clock exists in an active clock module CKM, a warning operation is performed in step 1007 and step 1008 is carried out. In step 1008, it is checked whether an alternative clock CKM exists, and if so, the clock module CKM is replaced in step 1009, and step 1001 is performed to again check the state. If no alternative clock module CKM is available in step 1008, a warning operation is carried out in step 1010 and step 1011 is performed to check for the existence of a replacement switching module. Similarly, in the case of an alternative switching module SWM being available, active switching module SWM is changed in step 1012, and then step 1001 is performed to again check the state. Otherwise, a warning operation is performed and the communication/exchange processing portion is shut down. The following Table 3 shows an example of values indicated by the output bits of a status port of each clock module when the duplication of both a reference communication clock generator and clock module is manifested at the same time as described above.

TABLE 3

| status port output bit | D3 | D2 | D1 | D0 |
|---|---|---|---|---|
| indicated state | standby | STD | RCV | LOC |

In Table 3, a D3 bit of "1" indicates "standby," while a "0" indicates "no standby available" due to some trouble, or an "activated use state." When bits D2, D1 and D0 are "1," respectively, a corresponding reference communication clock being served is indicated, while respective "0's" indicate that no corresponding reference communication clock is served.

As described above, the present invention is to reduce the occurrence of a system-down phenomenon due to trouble with the communication clock of a communication/exchange processing portion, where possible, and is effective in improving the reliability of a communication network.

What is claimed is:

1. A communication/exchange processing system constituting a network comprising:
   multi-line interface means for interfacing with a plurality of data transmission lines;
   a plurality of reference communication clock generators operated independent of each other, for generating respective reference communication clocks;
   a clock module commonly connected to the plurality of reference communication clock generators, for receiving a reference communication clock at a given time and generating various application communication clocks used in communication, and having status port showing the operation states of said clock module;
   a communication processor connected to the status port of the clock module, for checking the state of the active clock module by polling at predetermined intervals to change the reference communication clock received in said clock module if the active clock module is determined to be abnormal, and for performing communication control operations; and
   a switching module, one end of which is connected to the multi-line interface means and the other end of which is commonly connected to the communication processor and said clock module, for performing a switching operation via software according to channels.

2. A communication/exchange processing system as claimed in claim 1, wherein said plurality of reference communication clock generators comprises:
   a standard communication clock generator comprising an oscillation circuit having a high performance stabilization circuit, for generating a standard communication clock which can be used for one node as a reference communication clock and at the same time, be transmitted to other nodes on said network;
   a recovery communication clock generator including a phase-locked loop, for receiving a standard communication clock from another node on said network through a predetermined channel and generating a clock synchronized with said received standard communication clock; and
   a local communication clock generator for generating a reference communication clock used only for one node on said network.

3. A communication/exchange processing system constituting a network comprising:
   multi-line interface means for interfacing with a plurality of data transmission lines,
   a plurality of reference communication clock generators operated independently of one another, for generating respective reference communication clocks;
   a plurality of clock modules commonly connected to said plurality of reference communication clock generators, for receiving a reference communication clock at a given time and generating various application communication clocks used in communication, and having status ports showing the operation states of said plurality of clock modules;
   a communication processor connected to the status ports of said plurality of clock modules, for selectively activating one of said plurality of clock modules at a given time, and checking the state of said activated clock module by polling at predetermined intervals to change said reference communication clock input by said activated clock module and/or to change said activated clock module [if]when said activated clock module is determined to be abnormal, and for performing communication control operations; and
   a switching module, one end of which is connected to said multi-line interface means and the other end of which is commonly connected to said communication processor and said plurality of clock modules, and to subscriber peripherals, for performing a switching operation via software according to channels.

4. A communication/exchange processing system as claimed in claim 3, wherein said plurality of communication reference clock generators comprises:
   a standard communication clock generator comprising an oscillation circuit having a high performance stabilization circuit, for generating a standard communication clock which can be used as a reference communication clock for one node and at the same time, be transmitted to other nodes on said network;

a recovery communication clock generator including a phase-locked loop, for receiving a standard communication clock from another node on said network through a predetermined channel and generating a clock synchronized with the received standard communication clock; and a local communication clock generator for generating a reference communication clock used only for one node on said network.

5. In a method for reducing the occurrence of a system-down phenomenon due to communication clock trouble in a communication/exchange processing system comprising a plurality of reference communication clock generators, a clock module having a status port and for selectively receiving one of the plurality of reference communication clocks and generating various application communication clocks, and a communication processor for performing communication/exchange control operations, a clock controlling method of a communication/exchange processing system comprising the steps of:

polling a status port of said clock module at a given intervals in time and determining whether clock trouble exists; and changing said reference communication clock received in said clock module, if clock trouble exists.

6. A clock controlling method of the communication/exchange processing system as claimed in claim 5, further comprising the step of performing a predetermined warning, if clock trouble exists.

7. In a method for reducing the occurrence of a system-down phenomenon due to communication clock trouble in a communication/exchange processing system comprising a plurality of reference communication clock generators, a plurality of clock modules each having a status port and for selectively receiving one of a plurality of reference communication clocks and generating various application communication clocks, only one of said plurality of clock modules being active at a given time, multi-line interface means for performing a connection process with a plurality of data transmission lines, a communication processor for performing communication/exchange control operations, and a switching module for performing a switching operation via software according to channels, a clock controlling method of a communication/exchange processing system comprising the steps of:

polling the status port of the active clock module at predetermined intervals and determining whether clock trouble exists;

determining whether an alternative reference communication clock exists in said active clock module, when clock trouble exists;

changing a received reference communication clock when an alternative reference communication clock exists in an active clock module;

determining whether a standby clock module exists when no alternative reference communication clock exists in an active clock module; and shutting the system down in the absence of a standby clock module, and otherwise activating a standby clock module and repeating the above described previous steps.

8. A clock controlling method of communication/exchange processing system as claimed in claim 7, further comprising the step of performing a predetermined warning, if clock trouble exists.

9. A clock controlling method of the communication/exchange processing system as claimed in claim 7, wherein said step of determining the existence or absence of clock trouble is carried out by determining the existence of clock trouble if a frame sync signal is not detected in received data, and determining the absence of clock trouble if a frame sync signal is detected.

10. A clock controlling method of the communication/exchange processing system as claimed in claim 7, further comprising the step of performing a predetermined warning when no standby reference communication clock exists in said active clock module.

11. A clock controlling method of the communication/exchange processing system as claimed in claim 7, further comprising the step of performing a predetermined warning if the absence of a standby clock module is determined when activating said standby clock module is required.

12. In a method for reducing the occurrence of a system-down phenomenon due to communication clock trouble in a communication/exchange processing system comprising a plurality of reference communication clock generators, a plurality of clock modules each having a status port and for selectively receiving one of a plurality of reference communication clocks to generate various application communication clocks, only one of said clock modules being active at a given time, multi-line interface means for performing a connection process with a plurality of data transmission lines, a communication processor for performing communication/exchange control operations, and a plurality of switching modules, only one of which is active at a given time, for performing a switching operation via software according to channels, a clock controlling method of a communication/exchange processing system comprising the steps of:

polling status ports of said clock modules and determining whether clock trouble exists;

determining whether an alternative reference communication clock exists in an active clock module in the case of the occurrence of clock trouble;

changing a received reference communication clock when an alternative reference communication clock exists in an active clock module;

determining whether a standby clock module exists when no alternative reference communication clock exists in an active clock module;

changing an active clock module when a standby clock module exists, and repeating the above mentioned previous step;

determining whether a standby switching module exists, if no standby clock module exists; and shutting the system down in the absence of a standby switching module, and otherwise activating a standby switching module and repeating the above mentioned previous steps.

13. A clock controlling method in a communication/exchange processing system of a network having a subscriber processing system for reducing occurrences of a system-down phenomenon due to communication clock trouble, said communication/exchange processing system comprising a plurality of reference communication clock generators for generating a plurality of reference communication clocks, a plurality of clock modules each having a status port, for selectively receiving a different one of said plurality of reference communication clocks to generate a plurality of application communication clocks, a multi-line interface circuit for interfacing with a plurality of data transmission lines within said network, a communication processor for performing communication/exchange control operations, and a switching module for enabling the multi-line interface circuit to connect with the clock module in dependence upon first channels, the multi-line interface circuit to connect with the communication processor in dependence upon second channels, and the communication processor to the subscriber processing system in dependence upon third channels, said clock controlling method comprising the steps of:

(a) checking the status port of an active clock module from one of said first and second clock modules to determine whether said active clock module is in a standby state, and whether a first reference communication clock from said plurality of reference communication clocks is present in said active clock module;

(b) if said first reference communication clock is present in said active clock module, detecting a frame sync signal from data received through said multi-line interface circuit by synchronizing said first reference communication clock with said data received through said multi-line interface circuit, enabling communication between said active clock module and said multi-line interface circuit for a predetermined interval if said frame sync signal is detected, and alternatively generating a first warning signal indicative of said communication clock trouble if said frame sync signal is not detected;

(c) if said first reference communication clock is not present in said active clock module, generating a second warning signal indicative of said communication clock trouble;

(d) determining whether an alternate clock module from the remaining one of said first and second clock modules is available if one of said first and second warning signals is generated;

(e) if said alternate clock module is available, replacing said active clock module with said alternate clock module and repeating said steps (a), (b), (c) and (d); and (f) if said alternate clock module is not available, generating a third warning signal indicative of said communication clock trouble and shutting down operation of said communication/exchange processing system.

14. A clock controlling method in a communication/exchange processing system of a network having a subscriber processing system for reducing occurrences of a system-down phenomenon due to communication clock trouble, said communication/exchange processing system comprising a plurality of reference communication clock generators for generating a plurality of reference communication clocks, a plurality of clock modules each having a status port, for selectively receiving a different one of said plurality of reference communication clocks to generate a plurality of application communication clocks, a multi-line interface circuit for interfacing with a plurality of data transmission lines within said network, a communication processor for performing communication/exchange control operations, and a switching module for enabling the multi-line interface circuit to connect with the clock module, the multi-line interface circuit to connect with the communication processor, and the communication processor to the subscriber processing system, said clock controlling method comprising the steps of:

checking the status port of an active clock module from one of said first and second clock modules to determine whether said active clock module is in a standby state, and whether a first reference communication clock from said plurality of reference communication clocks is present in said active clock module;

if said first reference communication clock is not present in said active clock module, generating a first warning signal indicative of said communication clock trouble in said active clock module;

if said first reference communication clock is present in said active clock module, detecting a frame sync signal from data received through said multi-line interface circuit by synchronizing said first reference communication clock with said data received through said multi-line interface circuit;

if said frame sync signal is detected, setting a polling time of said active clock module to a predetermined value, enabling communication between said active clock module and said multi-line interface circuit for a time period corresponding to said predetermined value, and proceeding back to the step of checking the status port of said active clock module;

if said frame sync signal is not detected, determining whether a second and alternate communication clock from said plurality of reference communication clocks is available;

if said second and alternate communication clock is available, replacing said first reference communication clock with said second and alternate communication clock and proceeding back to the step of detecting said frame sync signal;

if said second and alternate communication clock is not available, proceeding back to the step of generating said first warning signal;

if said first warning signal is generated, determining whether an alternate clock module from the remaining one of said first and second clock modules is available;

if said alternate clock module is available, replacing said active clock module with said alternate clock module and proceeding back to the step of checking the status port of the currently active clock module; and if said alternate clock module is not available, generating a second warning signal indicative of said communication clock trouble and shutting down operation of said communication/exchange processing system.

15. The clock controlling method as claimed in claim 14, wherein said plurality of communication clock generators comprises a standard communication clock generator including an oscillation circuit for generating a standard communication clock to be used as said first reference communication clock, a recovery communication clock generator including a phase-locked-loop for receiving said standard communication clock and generating said second and alternate communication clock, and a local communication clock generator for generating a third and alternate communication clock.

16. A clock controlling method in a communication/exchange processing system of a network having a subscriber processing system for reducing occurrences of a system-down phenomenon due to communication clock trouble, said communication/exchange processing system comprising a plurality of reference communication clock generators for generating a plurality of reference communication clocks, a plurality of clock modules each having a status port, for selectively receiving a different one of said plurality of reference communication clocks to generate a plurality of application communication clocks, a multi-line interface circuit for interfacing with a plurality of data transmission lines within said network, a communication processor for performing communication/exchange control operations, and a switching module for enabling the multi-line interface circuit to connect with the clock module, the multi-line interface circuit to connect with the communication processor, and the communication processor to the subscriber processing system, said clock controlling method comprising the steps of:

- checking the status port of an active clock module from one of said first and second clock modules to determine whether said active clock module is in a standby state, and whether a first reference communication clock from said plurality of reference communication clocks is present in said active clock module;
- if said first reference communication clock is not present in said active clock module, generating a first warning signal indicative of said communication clock trouble in said active clock module;
- if said first reference communication clock is present in said active clock module, detecting a frame sync signal from data received through said multi-line interface circuit by synchronizing said first reference communication clock with said data received through said multi-line interface circuit;
- if said frame sync signal is detected, enabling communication between said active clock module and said multi-line interface circuit for a predetermined period, and proceeding back to the step of checking the status port of said active clock module;
- if said frame sync signal is not detected, determining whether a second and alternate communication clock from said plurality of reference communication clocks is available;
- if said second and alternate communication clock is available, replacing said first reference communication clock with said second and alternate communication clock and proceeding back to the step of detecting said frame sync signal;
- if said second and alternate communication clock is not available, proceeding back to the step of generating said first warning signal;
- if said first warning signal is generated, determining whether an alternate clock module from the remaining one of said first and second clock modules is available;
- if said alternate clock module is available, replacing said active clock module with said alternate clock module and proceeding back to the step of checking the status port of the currently active clock module;
- if said alternate clock module is not available, generating a second warning signal indicative of said communication clock trouble;
- if said second warning signal is generated, determining whether an alternate clock module from the remaining one of said first and second clock modules is available;
- if said alternate clock module is available, replacing said active clock module with said alternate clock module and proceeding back to the step of checking the status port of the currently active clock module; and
- if said alternate clock module is not available, generating a third warning signal indicative of said communication clock trouble and shutting down operation of said communication/exchange processing system.

17. The clock controlling method as claimed in claim 16, wherein said plurality of communication clock generators comprises a standard communication clock generator including an oscillation circuit for generating a standard communication clock to be used as a first reference communication clock, a recovery communication clock generator including a phase-locked-loop for receiving said standard communication clock and generating a second and alternate communication clock, and a local communication clock generator for generating a third and alternate communication clock.

* * * * *